(12) United States Patent
Lee

(10) Patent No.: US 6,578,678 B2
(45) Date of Patent: Jun. 17, 2003

(54) SPLASH SHIELD WITH VANES FOR DISC BRAKE ROTOR COOLING

(75) Inventor: Kwangjin M. Lee, Novi, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/754,681

(22) Filed: Jan. 3, 2001

(65) Prior Publication Data

US 2002/0084150 A1 Jul. 4, 2002

(51) Int. Cl.$^7$ ............................................. F16D 55/02
(52) U.S. Cl. ..................... 188/71.6; 188/264 A; 301/6.3
(58) Field of Search ........................... 188/71.6, 264 R, 188/264 A, 264 AA, 264 W, 218 A; 301/6.3, 6.4, 37.1, 108.1

(56) References Cited

U.S. PATENT DOCUMENTS

| | | | |
|---|---|---|---|
| 1,966,169 A | 7/1934 | Forbes | |
| 2,659,460 A | 11/1953 | Lyon | |
| 3,394,780 A | 7/1968 | Hodkinson | |
| 4,164,273 A | 8/1979 | McElroy | |
| 4,313,528 A | 2/1982 | Ito | |
| 4,326,610 A | 4/1982 | Mouza | |
| 4,484,667 A | 11/1984 | Bottieri, Jr. | |
| 4,540,069 A | 9/1985 | Bolenbaugh et al. | |
| 4,596,312 A | * 6/1986 | Kawaguchi | 188/18 A |
| 5,064,029 A | 11/1991 | Araki et al. | |
| 5,293,967 A | 3/1994 | Siegrist | |
| 5,324,099 A | 6/1994 | Fitzhugh | |
| 5,474,160 A | * 12/1995 | Siegrist | 188/264 R |
| 5,474,161 A | 12/1995 | Eaton, III et al. | |
| 5,544,726 A | 8/1996 | Topouzian et al. | |
| 5,671,827 A | * 9/1997 | Demetriou et al. | 188/71.6 |
| 6,047,796 A | * 4/2000 | Fitzgerald | 188/218 A |
| 6,155,650 A | * 12/2000 | Barger | 301/6.3 |

* cited by examiner

*Primary Examiner*—Pam Rodriguez
(74) *Attorney, Agent, or Firm*—Scott A. McBain

(57) ABSTRACT

A splash shield for a vehicle wheel disc brake assembly is provided. Each wheel disc brake assembly includes a brake rotor having an inner brake surface and a splash shield. The splash shield includes a central attachment portion. Extending from the central attachment portion is a flange-shaped shield portion. The shield portion has an outer surface with a plurality of generally radially extending vanes formed on the outer surface of the shield portion, the vanes being positioned adjacent the inner brake surface of the brake rotor when the splash shield is mounted to the vehicle.

26 Claims, 3 Drawing Sheets

SPLASH SHIELD WITH VANES FOR DISC BRAKE ROTOR COOLING

TECHNICAL FIELD

The present invention relates generally to disc brake assemblies for vehicles, and more specifically, to a brake protection device having vanes arranged to provide increased airflow to a disc brake rotor while preventing the entry of dirt and water into the brake mechanism.

BACKGROUND OF THE INVENTION

It is known to provide stamped metal shield components for brake assemblies in vehicles to protect the brake components from water, dust and other potentially harmful foreign particles. Generally, a sheet metal stamping is attached to the axle adjacent the brake rotor with the shield extending radially to a point adjacent the rim of the vehicle wheel and provided with openings through which the brake actuating mechanism and the like may be provided.

FIG. 1 illustrates a typical splash shield 10. Generally, the splash shield 10 includes a central "hat portion" 12 or attachment portion and an annular shield portion 14. A plurality of bolts 16 fix the "hat portion" 12, a disc-shaped attachment portion with a depending annular sidewall or extending portion 18, to an axle housing (not shown) located at the back of the shield 10, adjacent an axle 20 of the vehicle. The shield portion 14 is a flange-like radial extension of the sidewall 18. In practice, while providing an important shielding benefit, shields tend to discourage free flow of air about the brake surfaces and thus, tend to trap heat in the brake components.

Heat is generated in the brake rotor as the kinetic energy of the moving vehicle is converted to heat energy through the frictional interface between brake pads forcibly applied against the brake rotor. One effect of overheating of brake components is warping or coning of the brake rotor. This distortion of the rotor may cause increased pedal travel and effort, or roughness felt in the brake pedal under moderate braking. Another result of overheating is a reduction of frictional properties at the brake interface above a predetermined temperature. This may result in longer stopping distances, especially after repetitive heavy stopping. Preventing the rubbing surfaces from exceeding a predetermined temperature also provides greater durability for the brake rotor and pads.

Finally, heat management has been one of the primary obstacles to designing a successful brake rotor constructed from a lower density material than case iron steel. Due to the increased thermal conductivity of the lower density materials, excessive heat may be conducted into the hub assembly of the vehicle to which the brake rotor is attached. This transfer of excess heat to other parts of the brake and hub assembly may negatively impact braking performance and may negatively impact the longevity of the brake and hub assembly.

To reduce heat management problems, partial splash shields and shields with large or multiple vent openings have been used to address the problem of reduced heat dissipation when using a shield, but these methods have resulted in compromised performance of the shield in preventing contamination of the brake components.

It would be desirable to provide a splash shield having effective shielding properties coupled with a way to promote heat transfer from a corresponding brake rotor.

SUMMARY OF THE INVENTION

One aspect of the present invention provides a splash shield for a vehicle wheel disc brake assembly. Each wheel disc brake assembly includes a brake rotor having an outer brake surface and a splash shield. The splash shield includes a central attachment portion. Extending from the central attachment portion is a flange-shaped shield portion. The shield portion has an outer surface with a plurality of generally radially extending vanes formed on the outer surface of the shield portion, the vanes being positioned adjacent the inner brake surface of the brake rotor when the splash shield is mounted to the vehicle.

In other aspects of the present invention the splash shield includes vanes that may extend at about a 45-degree angle from the radial direction. The vanes may have a longitudinal arcuate shape. The arcuate shape of the vanes may have a radius of about 6–10 centimeters. Preferably, the arcuate shape of the vanes may be a radius of about 8 centimeters. The arcuate shape of the vanes may be a radius of about 7.7 centimeters.

In further aspects of the invention, the splash shield may further include a sidewall portion depending from the central disc portion at a first edge, the sidewall portion extending and connecting to the shield portion at a second edge. A plurality of vents may be formed in the sidewall portion of the splash shield. A plurality of tabs having an edge attached to the sidewall portion adjacent the second edge of the sidewall portion and extending inwardly may be formed in the sidewall portion, each tab extending over an associated vent.

In further aspects of the invention, the splash shield may include vanes that extend from the outer surface of the shield surface a width of about 10 mm. The vanes may extend in a direction normal to the outer surface of the shield surface or may be inclined with respect to the outer surface of the shield surface. The vanes may have an arcuate shape extending across the width of the vane.

An aspect of the present invention includes a method of cooling a disc brake rotor. The method includes positioning a plurality of vanes of a splash shield adjacent the disc brake rotor and directing air along the vanes to cool the rotor. Further aspects of the method include disrupting concentric airflow patterns created by the rotor, flowing air through a plurality of vents formed in the splash shield and preventing foreign material from entering a space between the disc brake rotor and the splash shield.

An aspect of the present invention includes a system for cooling a disc brake rotor including means for directing air along a radial span of the disc brake rotor to cool the disc brake rotor, means for increasing air flow through the air directing means and means of preventing foreign material from accessing a space between the air directing means and the disc brake rotor.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PREFERRED EMBODIMENT

Figure 1:
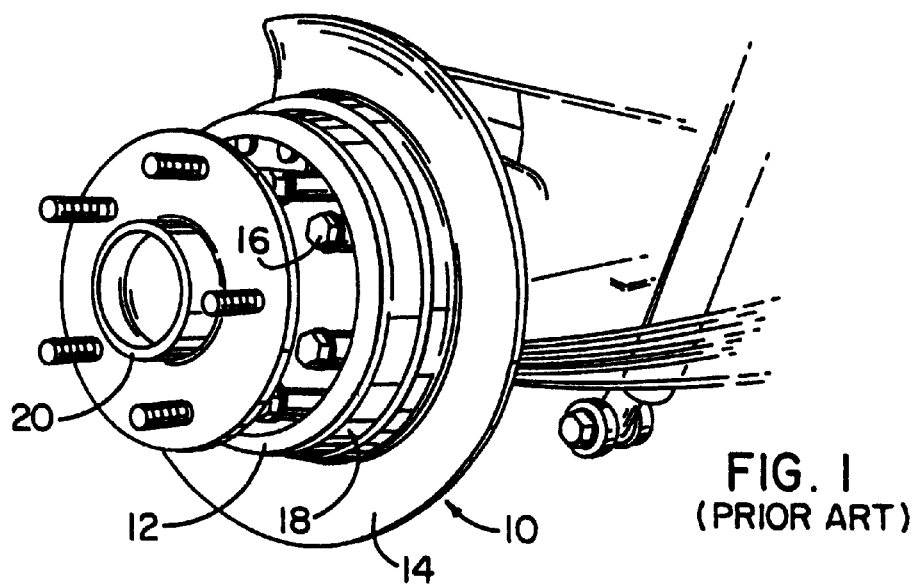
FIG. 1 is a perspective view of a prior art splash shield.
Figure 2:
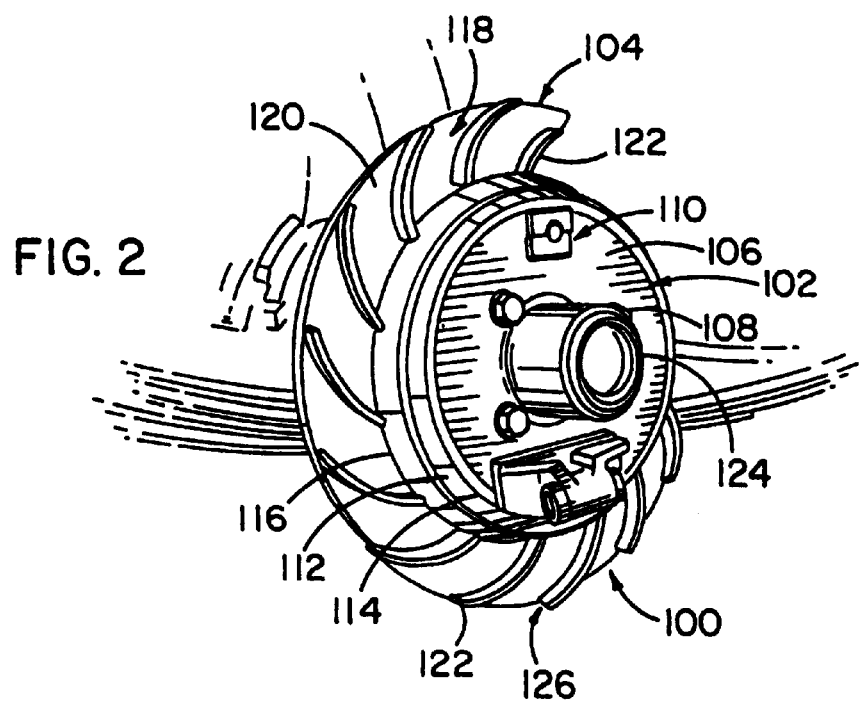
FIG. 2 is a perspective view of one embodiment of a splash shield of the present invention.

Referring to FIG. 2, one embodiment of the splash shield 100 of the present invention is shown. The splash shield 100 is formed of two main portions. A first portion, which serves as the attachment portion 102, is commonly referred to as the "hat portion". The second portion is a flange-shaped shield portion 104.

Generally the attachment portion 102 includes a central disc-shaped portion 106. The central disc-shaped portion 106 may include openings (not shown) for attachment bolts 108, or the like. The central disc-shaped portion 106 may include other openings 110 for allowing various brake mechanisms to pass through, such as hydraulic or wire-lines, brake piston housings and other mechanisms.

The central disc-shaped portion 106 of the attachment portion 102 may have, at a peripheral edge, an annular sidewall portion 112 attached thereto. The sidewall portion 112 extends from a first edge 114 attached to the peripheral edge of the central disc-shaped portion 106 to a second edge 116.

A shield surface portion 118, having the shape of a flange, may be attached to the second edge 116 of the sidewall portion 112 of the attachment portion 102. The shields surface portion 118 extends radially outwardly from the attachment portion 102. It will be understood that a purpose of the sidewall 112 is to space the shield surface portion 118 away from the plane of the central disc-shaped portion 106 as needed by the specifics of the particular installed wheel/brake components and associated mechanisms. In some instances, it is contemplated that the sidewall 112 may be a narrow band of sidewall material essentially corresponding to the periphery of the central disc-shaped portion 106. In other instances, the sidewall 112 may be an extended sidewall. In the embodiment shown, the sidewall portion 112 is an extended sidewall adapted to space the shield surface portion 118 a predetermined distance from an associated brake rotor surface (not shown) as will be described more fully herein.

The shield surface portion 118 includes a substantially flat outer surface 120 upon which a plurality of vanes 122 are formed or attached. The vanes 122 are generally rectangular extensions or tabs that extend in the longitudinal direction radially attached to the flat outer surface 120 of the shield surface portion 118. In other words, the longitudinal axis of each vane 122 is oriented in a generally radial direction with respect to the orientation of the vehicle axis 124.

The vanes 122 also extend from the shield outer surface 120 a width 126 that is, in this embodiment, a normal or perpendicular direction with respect to the plane of the shield outer surface 120. The width of the vanes 122 is preferably about 10 mm. However, it should be understood that the width of the vanes 122 can be any effective widths, e.g. from about 2 mm to about 20 mm, depending upon the application and available space.

Figure 4:
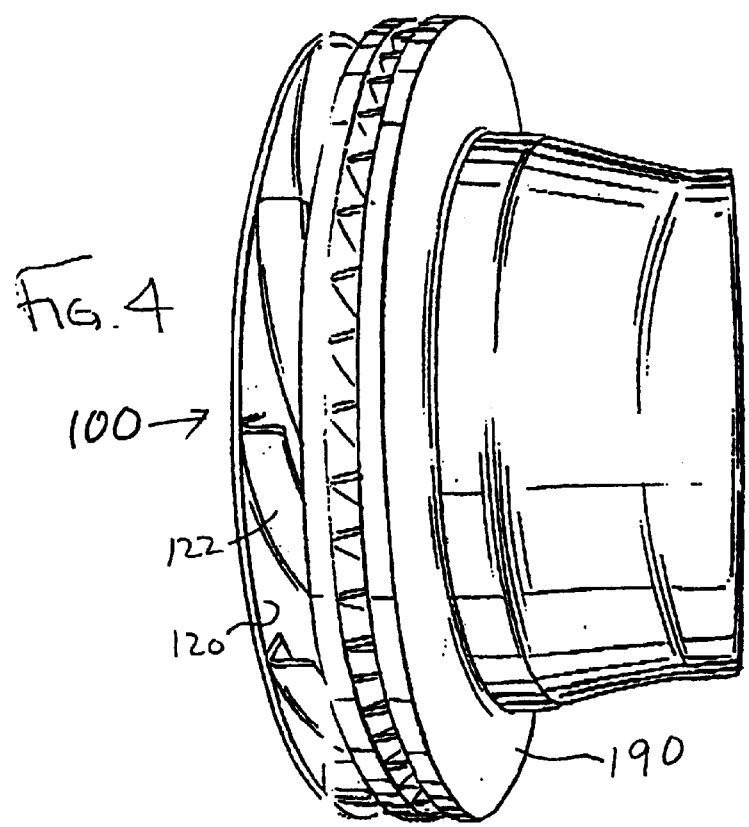
FIG. 4 is a perspective view of one embodiment of the present invention with an adjacent installed brake rotor at the rear, right side of a vehicle.

In operation, the splash shield 100 remains fixed in place and the rotor (not shown) rotates with the associated wheel. As the rotor rotates, the vanes 122 of the splash shield 100 pumps cooling air across the surface of the associated rotor (as shown in FIG. 4). In a typical, prior art brake system, with regard to the outside of a moving brake rotor, the pattern of airflow tends to remain in a concentric, circular, non-renewable or stagnant pattern. In other words, the airflow adjacent the outer surfaces of the brake rotor do not tend to flow across the brake rotor in such a manner as to provide continuous renewed airflow and thus, cooling to the rotor. It is believed that the generally radial vanes 122 operates to break up the concentric or circular airflow patterns and tends to urge or pump cooling air across the radial span of the rotor.

To this end, the vanes 122 may have a number of configurations. In the embodiment shown in FIG. 2 the vanes 122 are inclined along a longitudinal axis of each vane with respect to a radial orientation. In one embodiment, the angle along the long axis of each vane is offset about 45 degrees with respect to the radial orientation. In other words, instead of being strictly radial, each vane is tilted away from the radial direction an angle of about 45 degrees. This inclination produces an efficient pumping action. Further, in another embodiment, as opposed to being planar, the vanes 122 have a curved or arcuate shape with respect to the longitudinal axis of the vane 122. The vanes 122 may have any curved shape that produces effective cooling. The radius of the arc may be from about 6–10 centimeters, the actual radius being determined by the specific application. It has been found that in a standard automobile application, that a radius of arc of about 8 centimeters provides a substantial increase in the cooling efficiency of the splash shield as compared to a conventional splash shield without vanes. In one embodiment the radius of arc of the vanes is about 7.7 centimeters.

Figure 3:
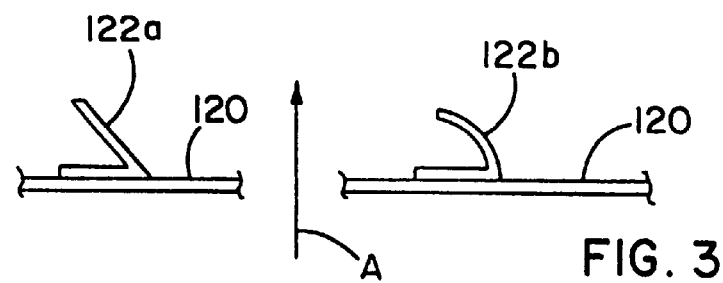
FIG. 3 is a side view of two alternate embodiments of a vane design of the present invention.

Other variations of vane design and orientation may provide benefits to the splash shield. In FIG. 3 two alternate vane designs are illustrated with the axial direction shown at arrow A. In FIG. 3 the vanes 122a are shown inclined with respect to the shield surface 120, and the vanes 122b are shown with a second arc, i.e., an arc with respect to the width of the vane.

Referring to FIG. 4, the splash shield 100 of FIG. 2 is shown with a brake rotor 190 in place. It will be noticed that the vanes 122 are attached to the splash shield outer surface 120 as to be oriented adjacent the brake rotor. The distance of the edge of the vanes 122 adjacent the rotor 190 can be, in one embodiment, for example, about 2 mm.

Figure 5:
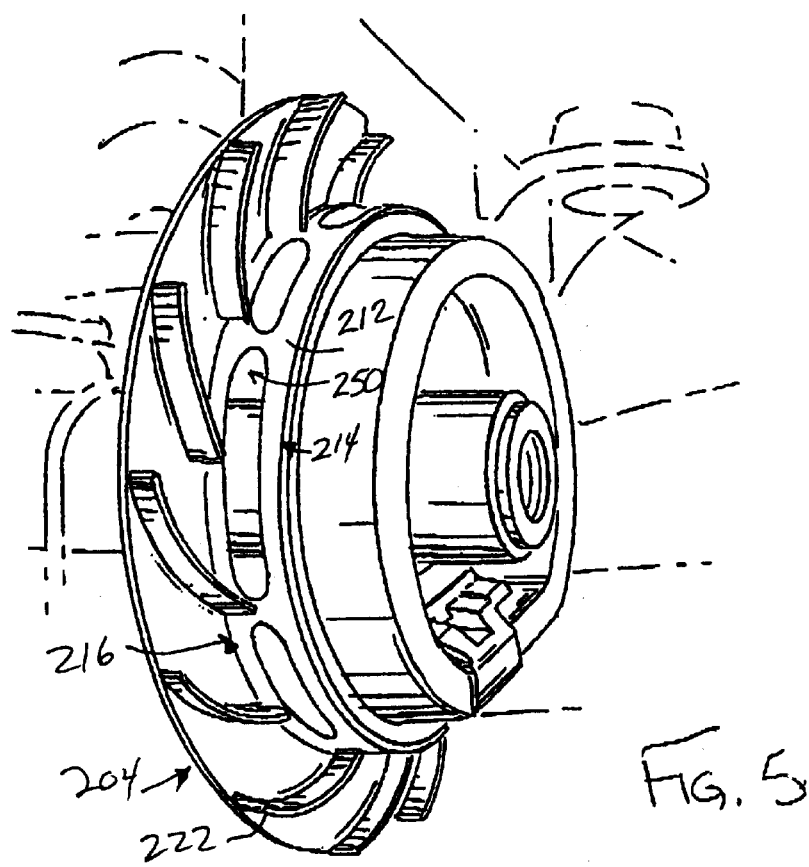
FIG. 5 is a perspective view of another embodiment of the present invention.

Referring to FIG. 5, an embodiment of the present invention is shown wherein the sidewall 212 includes a plurality of openings 250, slots, vents or the like, formed therein. The vents 250 are formed in the sidewall 212 between the first end 214 and second end 216. The vents 250 serve to promote the entry of cooling air into the space between the shield portion 204 and an inner brake surface and in between the vanes 222.

Figure 6:
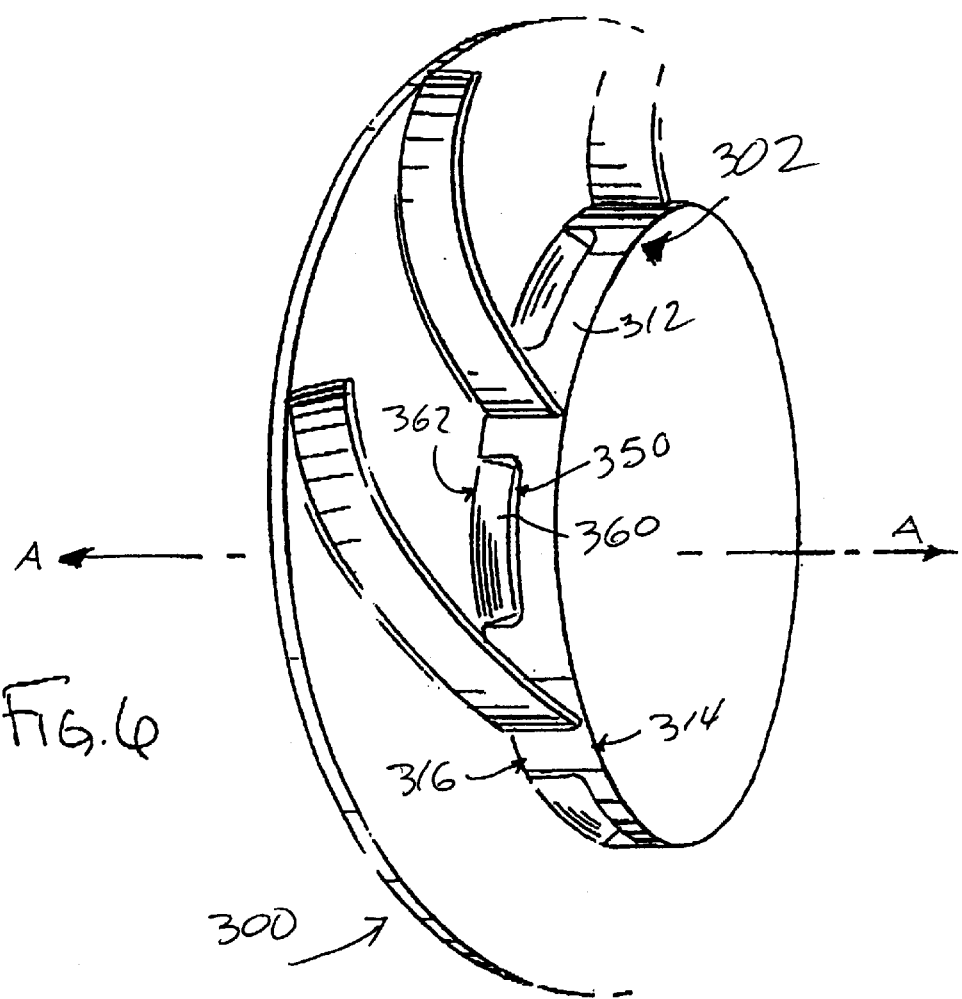
FIG. 6 is a partial perspective view of another embodiment of the present invention.
Figure 7:
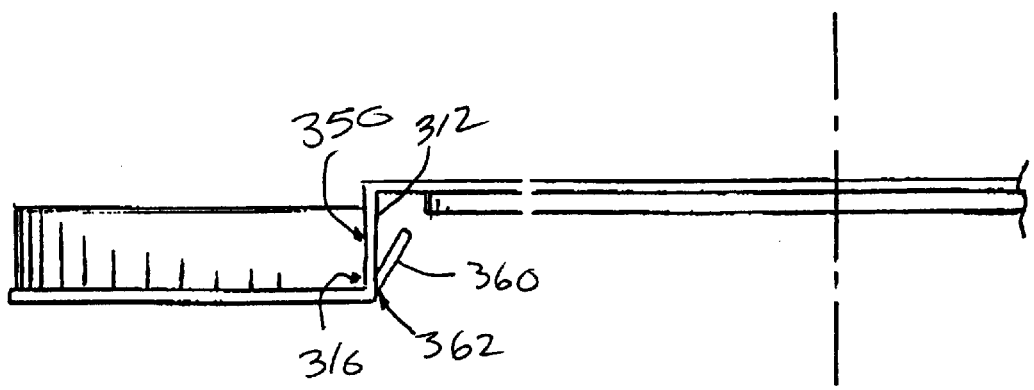
FIG. 7 is a cross-sectional side view of the shield of FIG. 6 along line A—A.

Another embodiment of the splash shield 300 is shown in FIGS. 6 and 7 wherein a plurality of tabs 360, associated with the vents 350, may be provided. The tabs 360 are generally rectangular or oval tabs, each one of which may be associated with a single vent 350. Each tab 360 is attached to the attachment portion 302, in particular, to the sidewall portion 312 having first edge 314 and second edge 316, by an attachment edge 362. In the illustrated embodiment, the tab attachment edge 362 is located adjacent the second edge 316 of the sidewall portion 312. The tabs 360 are displaced radially inwardly with respect to the sidewall 312. In this manner, foreign material is prevented from entering the space between an associated brake rotor (not shown) and the shield 300, but air is allowed to enter or be drawn into the space for cooling purposes.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A splash shield for a vehicle wheel disc brake assembly, each wheel disc brake assembly including a brake rotor having an inner brake surface, the splash shield comprising:
   a central disc portion;
   a flange-shaped shield portion extending radially outwardly from the central disc portion, the shield portion having an outer surface;
   a sidewall portion extending between the central disc portion and the shield portion the sidewall portion being substantially perpendicular to the shield portion;
   a plurality of vanes formed on the outer surface of the shield portion, the vanes extending from adjacent an outer edge of the shield portion inward toward the central disc portion; and
   wherein the splash shield remains stationary with respect to wheel rotation.

2. The splash shield of claim 1 wherein the vanes are adapted to be positioned adjacent the inner brake surface of the brake rotor when the splash shield is mounted to the vehicle.

3. The splash shield of claim 1 wherein each of the plurality of vanes extend in a direction at about a 45-degree angle with respect to the radial direction.

4. The splash shield of claim 1 wherein each of the plurality of vanes has an arcuate shape.

5. The splash shield of claim 4 wherein the radius of the arcuate shape of the vanes is a radius of about 6 to 10 centimeters.

6. The splash shield of claim 5 wherein the radius of the arcuate shape of the vanes is a radius of about 8 centimeters.

7. The splash shield of claim 5 wherein the radius of the arcuate shape of the vanes is a radius of about 7.7 centimeters.

8. The splash shield of claim 1 wherein a plurality of vents are formed in the sidewall portion of the splash shield.

9. The splash shield of claim 8 wherein the sidewall portion has a first and a second edge, the first edge being attached to the central disc portion and the second edge being attached to the shield portion.

10. The splash shield of claim 9 wherein a plurality of tabs is attached to the sidewall portion, each tab being associated with one of the plurality of vents.

11. The splash shield of claim 10 wherein each tab is attached to the sidewall portion by an attaching edge portion, the attaching edge portion located adjacent the second edge of the sidewall portion.

12. The splash shield of claim 1 where each tab is displaced inwardly from the sidewall portion.

13. The splash shield of claim 1 wherein the vanes have a width extending from the outer surface of the shield portion a distance of about 10 mm.

14. The splash shield of claim 13 wherein the vanes extend in a direction normal to the outer surface of the shield portion.

15. The splash shield of claim 14 wherein the vanes extend in a direction inclined with respect to the outer surface of the shield portion.

16. The splash shield of claim 15 wherein the vanes have an arcuate shape with respect to the width of the vane.

17. A method of cooling a disc brake rotor comprising:
    directing air along a plurality of vanes extending from a splash shield;
    directing the air from the vanes through an opening formed in a sidewall of the splash shield, the sidewall extending substantially perpendicular to the splash shield.

18. The method of claim 17 further comprising:
    disrupting concentric airflow patterns created by the rotor.

19. The method of claim 17 further comprising:
    flowing air through a plurality of vents formed in the splash shield.

20. The method of claim 19 further comprising:
    preventing foreign material from entering a space between the disc brake rotor and the splash shield.

21. A system for cooling a disc brake rotor comprising:
    means for directing air along a radial span of the disc brake rotor to cool the disc brake rotor; and
    wherein the means for directing air include a shield having a substantially perpendicular sidewall portion; and
    wherein the air directing means remain stationary with respect to wheel rotation.

22. The system for claim 21 further comprising;
    means for increasing air flow through the air directing means.

23. The splash shield of claim 21 further comprising:
    means of preventing foreign material from accessing a space between the air directing means and the disc brake rotor.

24. A splash shield for a vehicle wheel disc brake assembly, each wheel disc brake assembly including a brake rotor having an inner brake surface, the splash shield comprising:
    a central disc portion;
    a flange-shaped shield portion extending radially outwardly from the central disc portion, the shield portion having an outer surface;
    a sidewall portion extending between the central disc portion and the shield portion, the sidewall portion having a first and a second edge, the first edge being attached to the central disc portion and the second edge being attached to the shield portion;
    a plurality of vanes formed on the outer surface of the shield portion, the vanes extending from adjacent an outer edge of the shield portion inward toward the central disc portion;
    a plurality of vents formed in the sidewall portion of the splash shield; and
    a plurality of tabs attached to the sidewall portion, each tab being associated with one of the plurality of vents.

25. The splash shield of claim 24 wherein each tab is attached to the sidewall portion by an attaching edge portion, the attaching edge portion located adjacent the second edge of the sidewall portion.

26. The splash shield of claim 25, where each tab is displaced inwardly from the sidewall portion.

* * * * *